W. G. MAYER.
VEHICLE WHEEL CHAIN.
APPLICATION FILED MAR. 10, 1916.
1,235,223.
Patented July 31, 1917.
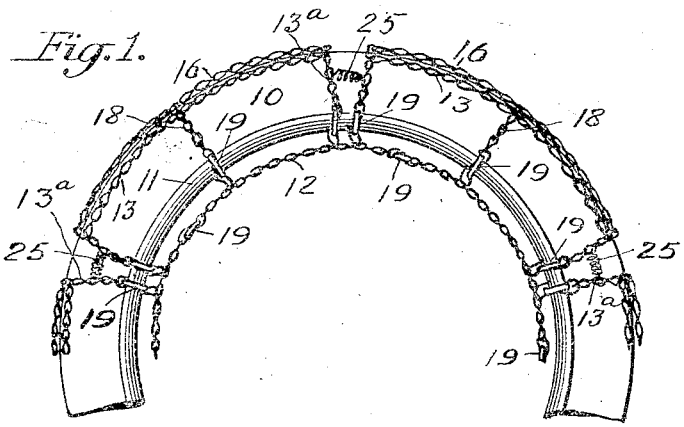
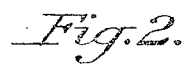
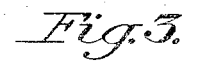
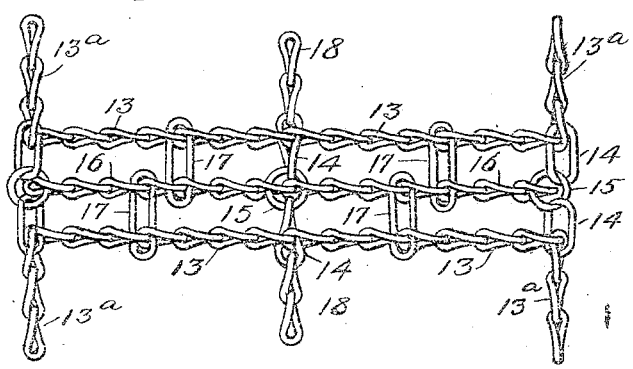
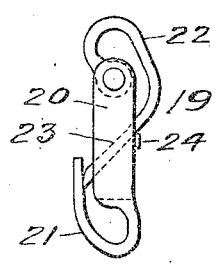
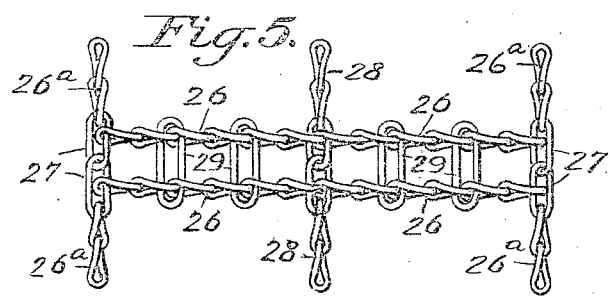
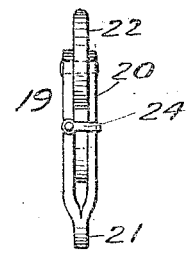
Witnesses
W Tamarise
J. M. Geoghegan.
Inventor
William G. Mayer
By James N. Cooke

UNITED STATES PATENT OFFICE.

WILLIAM G. MAYER, OF PITTSBURGH, PENNSYLVANIA.

VEHICLE-WHEEL CHAIN.

1,235,223.    Specification of Letters Patent.    Patented July 31, 1917.

Application filed March 10, 1916. Serial No. 83,274.

*To all whom it may concern:*

Be it known that I, WILLIAM G. MAYER, a citizen of the United States, and resident of Pittsburgh, in the county of Allegheny and State of Pennsylvania, have invented a new and useful Improvement in Vehicle-Wheel Chains; and I do hereby declare the following to be a full, clear, and exact description thereof.

My invention pertains to anti-skidding devices for automobile tires and the like, and relates especially to anti-skidding devices of the kind in which chain links are disposed upon the thread of the tire, to engage the road and thereby prevent skidding. One of the objects of my invention is to provide an anti-skidding device of the chain type which will be effective in preventing skidding, especially when used in connection with a heavy vehicle wheel, such as the wheel of an automobile truck or the like. It is another object of my invention to provide an anti-skidding device of the same type which will be easy and cheap to manufacture and which may readily be placed in position on a wheel or removed therefrom. It is another object of my invention to provide an anti-skidding device of the chain type in which there will be no liability of the parts thereof to become displaced with relation to one another. And other and further objects of my invention will appear from the following specification taken in connection with the appended claims.

By way of example, I have described in the following specification, and shown in the accompanying drawings an anti-skidding device constructed in accordance with my invention. It is to be understood, however, that the invention may be embodied in other forms, and that changes may be made in the forms described and shown, without exceeding the scope thereof, as defined in the appended claims.

In the drawing:

Figure 1 is a side elevation of a portion of a truck wheel having applied thereto an anti-skidding device constructed in accordance with my invention;

Fig. 2 is a plan view of one of the mats employed;

Fig. 3 is a side elevation of one of the tightening hooks;

Fig. 4 is an edge view of the same; and

Fig. 5 is a plan view of a modified form of mat.

Like reference characters refer to like parts throughout the following specification and the several figures of the drawing.

Referring now particularly to Fig. 1, 10 indicates the tire of the wheel of an automobile truck or the like, and 11 indicates the felly. My improved anti-skidding device comprises a plurality of mats arranged in a series around the tire 10, and secured, by means of intermediate devices, to be described below, to a chain 12 disposed around the wheel within the felly 11.

In the form shown in Figs. 1 and 2, each of the mats includes a pair of chains 13 disposed parallel with each other and extending longitudinally of the trail of the tire. The links of these chains are twisted so as to give a substantially uniform bearing upon the road. The chains 13 are connected together by suitably formed links 14, which in turn are joined by central rings 15. The connection, by means of the links 14 and rings 15, is made at a short distance from the ends of the chains 13 so as to leave loose chain sections $13^a$ at the terminals of the chains 13. The ends $13^a$ form continuous parts of one and the same piece of chain 13. Adjacent their centers, the chains 13 are connected by links 14 and a ring 15 similar to the links and rings employed near the ends. The rings 15 are connected by means of chain sections 16, the links of which are of the same nature as the chains 13. There are thus provided three parallel lines of chain extending lengthwise of the tire tread. In order to prevent further the chance of these chains spreading with respect to each other, the chain sections 16 are connected, on each side, to the chains 13 by means of links 17. Loose chain sections 18, similar to the chain ends $13^a$ but in the form of separate pieces, extend from the centers of the chains 13.

For connecting the mats to the retaining chain 12, I employ a plurality of tightening hooks constructed as shown in Figs. 3 and 4. Each hook, designated 19, includes a slotted body 20 having a hook 21 formed at the lower end thereof, the end of which hook comes close to the body 20 and is spaced therefrom only sufficiently to permit of a chain link being passed onto the hook. Pivotally mounted in the upper end of the slot of the body 20 is a hook 22 having a long end 23 which, when the hook 22 is closed, extends through the slot of the body and engages the end of the hook 21, thereby closing the latter. The hook 22 is so shaped that the draft on the same will not tend to open it; and its long end is so shaped that it may be used as a lever in closing the hook, thereby drawing toward each other the chains which are connected to it and to the hook 21. In order to prevent opening of the hook, due to jarring, vibration or the like, a pivoted latch 24 is provided, which latch may be swung across the end of the hook 22 when the latter is closed.

In securing the mats to the retaining chains 12, six of the hook members 19 are provided for each mat, one for the end of each of the chain sections 13$^a$ and 18. The manner of employing these hook members will be readily understood from Fig. 1. The hook 21 is inserted in a link of the chain 12. The end 23 of the pivoted hook 22 is then inserted in a link of one of the loose sections (13$^a$ or 18 as the case may be); and by the action of closing the hook 22, the loose chain section is tightened toward the retaining chain 12. By reason of the shape of the hook 22 there will normally be no tendency of such hook to open; but the latch 24 may be closed to prevent accidental opening due to jolts or the like. If it is desired to tighten the chain section toward the retaining chain 12 to a further extent, this may be effected by engaging the hook 22 with the next link on the chain section.

In order to provide an additional safeguard against the mats shifting lengthwise with respect to each other, I may provide short helical springs 25, connected between the adjacent chain sections 13$^a$ of each pair of mats, on each side of the wheel. The retaining chain 12 is divided into sections by means of a plurality of the hook members 19, inserted at various points therein. By means of these hook members, it is possible to tighten the retaining chain 12 if, and at any point, desired.

The anti-skidding device described above is extremely easy to make, is cheap, and may be applied to a wheel or removed therefrom with great facility. By means of the hook members 19, it is easy to tighten any of the parts if desired. There is no tendency, especially when the springs 25 are provided, of the parts of the device to move with respect to each other. The longitudinal chain sections, lying on the tread of the tire effectually prevent skidding; and they are aided in this by the connecting members 14, 15 and 17, which latter also prevent slipping of the wheel in a circumferential direction.

In Fig. 5 I have shown a modified form of mat, particularly adapted for use in connection with tires having narrow treads. In this mat chains 26 having loose ends 26$^a$ are provided, which correspond with the chains 13 of the form previously described, and are likewise in the form of continuous pieces. In this modification, the central chain sections 16 are dispensed with, the chains being connected together by three pairs of links 27. Loose chain sections 28 are connected at the center of the chains 26, and correspond with the sections 18 of the form described above. To prevent spreading of the chains 26, which are placed more closely together than in the form described above, a plurality of long links 29 are connected between them. The mats of the kind shown in Fig. 5 may be held in place in a manner similar to that described above in connection with Figs. 1 and 2.

Having thus fully described my invention what I claim as new and desire to secure by Letters Patent is:

1. In an anti-skidding device, a plurality of individual flexible mats adapted to lie on the tread of a tire, flexible sections depending from said mats at the ends thereof, coil spring connecting members operating with said flexible depending sections for connecting said mats together, a chain extending around the wheel within the periphery thereof, and a plurality of devices for connecting said flexible sections with said chain.

2. As an article of manufacture, an anti-skidding device, comprising a plurality of individual flexible mats composed of chain sections adapted to lie on the tread of a tire, portions of said chain sections depending from said mats at the ends thereof, coil spring connecting members coöperating with said depending chain sections for connecting said mats together, a chain extending around the wheel within the periphery thereof, and a plurality of devices connecting said flexible sections with said chain.

In testimony whereof I, the said WILLIAM G. MAYER, have hereunto set my hand.

WILLIAM G. MAYER.

Witnesses:
CHARLES G. COPE,
J. M. GEOGHEGAN.